United States Patent
Faranda et al.

(10) Patent No.: US 9,172,267 B2
(45) Date of Patent: Oct. 27, 2015

(54) CUSTOMER DEVICE PRESENTATION UNIT

(71) Applicant: Braun GmbH, Kronberg (DE)

(72) Inventors: Leo Faranda, Rodgau (DE); Alexander Hilscher, Oberursel (DE); Thomas Hoenig, Kronberg (DE); Felix Koenig, Darmstadt (DE); Christian Mandl, Bad Soden (DE)

(73) Assignee: BRAUN GMBH, Cincinnati, OH (US)

( * ) Notice: Subject to any disclaimer, the term of this patent is extended or adjusted under 35 U.S.C. 154(b) by 134 days.

(21) Appl. No.: 13/939,200

(22) Filed: Jul. 11, 2013

(65) Prior Publication Data

US 2014/0015479 A1 Jan. 16, 2014

(30) Foreign Application Priority Data

Jul. 13, 2012 (EP) .................................... 12176409

(51) Int. Cl.
*H02J 7/00* (2006.01)
*H02J 7/02* (2006.01)

(52) U.S. Cl.
CPC ............... *H02J 7/007* (2013.01); *H02J 7/0036* (2013.01); *H02J 7/0054* (2013.01); *H02J 7/025* (2013.01)

(58) Field of Classification Search
CPC ......... H02J 7/007; H02J 7/025; H02J 7/0036; H02J 7/0054; H02J 2003/143; H02J 3/14; H02J 9/065; H05B 33/08; H05B 33/0815

USPC .................................................. 320/107, 108
See application file for complete search history.

(56) References Cited

U.S. PATENT DOCUMENTS

| | | | |
|---|---|---|---|
| 6,150,796 A | 11/2000 | Ford | |
| 7,183,748 B1 | 2/2007 | Unno et al. | |
| 2005/0099156 A1 | 5/2005 | Brenner | |
| 2006/0238031 A1* | 10/2006 | Frey | 307/64 |
| 2007/0063669 A1* | 3/2007 | Keating | 320/107 |
| 2007/0108944 A1* | 5/2007 | Pellenc | 320/130 |
| 2007/0236180 A1 | 10/2007 | Rodgers | |
| 2009/0081545 A1* | 3/2009 | Zhang et al. | 429/207 |
| 2009/0267562 A1 | 10/2009 | Guccione | |
| 2011/0148344 A1 | 6/2011 | Manor et al. | |
| 2012/0139480 A1* | 6/2012 | Kaneko | 320/107 |
| 2013/0082662 A1* | 4/2013 | Carr et al. | 320/134 |

OTHER PUBLICATIONS

Cegasa model 6AS3/165 battery data sheet, Mar. 2009, pp. 1-3.*
International Search Report and Written Opinion for CM3759Q dated Sep. 24, 2013.
European Search Report for EP 12 17 6409, dated Nov. 21, 2012.

* cited by examiner

*Primary Examiner* — Vuthe Siek
(74) *Attorney, Agent, or Firm* — Vladimir Vitenberg

(57) ABSTRACT

A consumer device presentation unit is disclosed. The consumer device presentation unit includes at least a first electric consumer device including at least a first rechargeable energy storage; at least a first autonomous energy provision unit; and a charge module coupled at least to the first autonomous energy provision unit and the first electric consumer device.

13 Claims, 4 Drawing Sheets

CUSTOMER DEVICE PRESENTATION UNIT

FIELD OF THE INVENTION

The present disclosure relates to consumer device presentation units. More particularly, the present disclosure relates to consumer device presentation units that include at least a first electric consumer device that is equipped with at least a first rechargeable energy storage.

BACKGROUND OF THE INVENTION

Consumer device presentation units are known where electric consumer products such as electric toothbrushes are presented for trial use by users. The electric toothbrushes may be equipped with rechargeable energy sources such as accumulators. It is known that the electric toothbrushes are charged via inductive charger stands, which charger stands are connected to mains voltage.

Such consumer device presentation units support the consumer in deciding about the right electric consumer device to be bought as the consumer device presentation units allow for handling of the electric consumer device, switching it on, listening to its sound, investigating its haptic qualities etc.

There, however, exists a need for a consumer device presentation unit that is improved over the known consumer device presentation units, in particular with respect to a simpler or more diversified use of the consumer device presentation unit.

SUMMARY OF THE INVENTION

In one embodiment, a consumer device presentation unit is provided. The consumer device presentation unit includes at least a first electric consumer device including at least a first rechargeable energy storage; at least a first autonomous energy provision unit; and a charge module coupled at least to the first autonomous energy provision unit and the first electric consumer device.

These and other features, aspects and advantages of specific embodiments will become evident to those skilled in the art from a reading of the present disclosure.

BRIEF DESCRIPTION OF THE DRAWINGS

The embodiments set forth in the drawings are illustrative in nature and not intended to limit the invention defined by the claims The following detailed description of the illustrative embodiments can be understood when read in conjunction with the following drawings, where like structure is indicated with like reference numerals and in which:

DETAILED DESCRIPTION OF THE INVENTION

Figure 1:
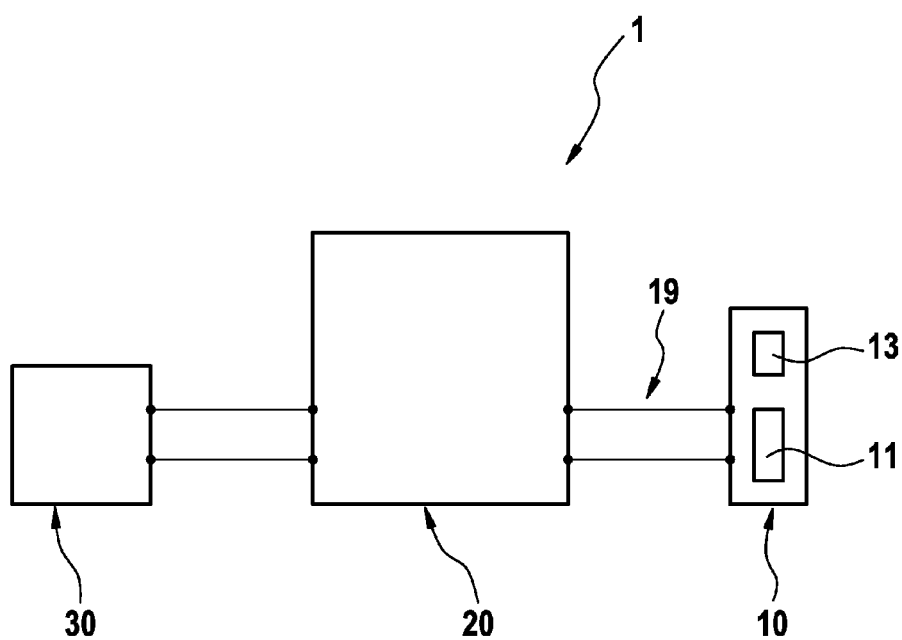
FIG. 1 is a schematic depiction of a first example embodiment of a consumer device presentation unit in accordance with the present disclosure.

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

A consumer device presentation unit in accordance with the present disclosure is a unit that is arranged for displaying at least a first electric consumer device, wherein the electric consumer device is intended for being seized by a consumer and for being switched on and off for trial use. In order to accomplish this, the first electric consumer device is equipped with at least a first rechargeable energy storage that allows trial use of the first electric consumer device. In one embodiment, the first rechargeable energy storage may be a rechargeable accumulator.

The consumer device presentation unit further has at least a first autonomous energy provision unit from which the first rechargeable energy storage will be charged under control of a charge module to compensate for energy loss during trial uses.

In one embodiment, the first autonomous energy provision unit may be arranged as a autonomous energy storage unit such as a battery or a battery pack. The term "autonomous" here refers to the fact that such energy provision units do not require to be connected to mains voltage but can provide energy independent from mains voltage. Other examples for autonomous energy provision units may comprise fuel cells, piezoelement based generators, dynamos, solar cells, thermoelectric generators (i.e. Peltier-element based generators), which autonomous energy provision units may in particular also comprise an energy storage element for intermediate energy storage between the generation of the energy and the use of the energy, for example, for charging of the first rechargeable energy storage. Such autonomous energy provision units as listed before may thus be autonomous not only with respect to connection to mains voltage but also with respect to replacement of depleted energy storages.

In some embodiments, the consumer device presentation unit may comprise two, three, four, five, six, seven, eight or even more electric consumer devices that are presented for trial use. The two or more electric consumer devices may be different to each other so that the user has the possibility to try different electric consumer devices and to determine the device that suits him or her best. Each of the electric consumer devices may comprise a rechargeable energy storage. In some embodiments, the consumer device presentation unit may comprise two or more autonomous energy provision units. The two or more autonomous energy provision units may in particular each be assigned to one or two or more electric consumer devices and the charge module may be arranged to charge an electric consumer device only from its assigned autonomous energy provision unit.

The first electric consumer device may in particular consume higher currents provided from the first rechargeable energy storage than could be provided by the first autonomous energy provision unit in a constant manner. In some embodiments, the first electric consumer device may consume during regular operation a current in a range of between about 0.5 Ampere to about 2.5 Ampere, in another embodiment in a range of between about 1.0 Ampere to about 2.0 Ampere, while the first autonomous energy provision unit may be arranged to provide a constant current of below about 0.2 Ampere, in another embodiment of below about 0.1 Ampere and in yet another embodiment of below about 0.05 Ampere.

In some embodiments, the first electric consumer device may be an electric oral health device such as an electric toothbrush, an electric flosser, an electric tooth stick, an electric tongue cleaner, an electric oral irrigator etc. But this shall not be limiting as the first electric consumer device may also be an electric grooming device, an electric kitchen device, an electric household device etc.

A consumer device presentation unit in accordance with the present disclosure is intended to be placed in a store environment and is essentially intended for autonomous operation (i.e. without the need that the consumer device presentation unit needs to be connected to mains voltage). This allows positioning the consumer device presentation unit independent from the presence of any wall sockets, it also avoids power cords lying for example on the ground connecting the consumer device presentation unit with a wall socket. It further avoids any high voltages at the consumer device presentation unit so that operation of the consumer device presentation unit is of a relatively low risk in comparison to other such consumer device presentation units that require connection with mains voltage. The consumer device presentation unit may in particular be arranged to work with low voltages being in the range of between about 3 V to about 15 V and in one embodiment may work at 9 V regular voltage, while any other voltage value in the mentioned range may as well be chosen.

In some embodiments, the charge module is connected with the first electric consumer device for direct charging, where "direct charging" means that a wired connection is present between the charge module and the first electric consumer device. "Direct charging" therefore does not include inductive charging.

In some embodiments, the consumer device presentation unit may comprise a first support that is assigned to the first electric consumer device. The first support may be arranged for receiving the first electric consumer device such that it is in a rest position when it is placed in the first support. The charge module may be arranged for charging the first rechargeable energy storage while the first electric consumer device is received by the first support and may further be arranged to interrupt charging when the first electric consumer device is removed from the first support. This interruption saves energy and thus may lead to a longer usage period until the first autonomous energy storage needs to be replaced or recharged. The user will also then get the same feeling as in case of a regular device, as in case that charging would continue after the first electric consumer device is being removed from the first support, this may still be visualized at the first electric consumer device, for example, by a blinking LED or the like. In some embodiments, the charge module may log the number of removals for later analysis. In embodiments where the consumer device presentation unit comprises two or more electric consumer devices, the charge module may be arranged to sequentially charge the electric consumer devices. Sequential charging in contrast to parallel charging allows for using a first autonomous energy provision unit that provides only a limited constant current that is below the charging current that would be required for parallel charging of two electric consumer devices.

In some embodiments, the first electric consumer device may be arranged for inductive charging and the charge module may then be arranged to emulate a direct charging procedure similar to inductive charging. This would allow to use first electric consumer devices essentially as they would be sold as regular devices as the charging procedure, while not being identical, would be emulated such that the first electric consumer device would not need to be modified.

FIG. 1 is a schematic depiction of an example embodiment of a consumer device presentation unit 1. The consumer device presentation unit 1 comprises a first electric consumer device 10 that is equipped with a first rechargeable energy storage 11, a charge module 20 that is coupled (for example, directly connected) with the first electric consumer device 10 for direct charging of the first rechargeable energy storage 11. The charge module 20 is further coupled to (for example, directly connected to) a first autonomous energy provision unit 30. The first electronic consumer device 10 is coupled to the charge module 20 via a cable 19. The cable 19 may in particularly be mounted to the first electric consumer device 10 in a non-detachable manner so that the cable 19 would also function as a theft protection that inhibits unwanted removal of the first electric consumer device 10 from the consumer device presentation unit 1 (i.e. the cable is mounted to the first electric consumer device 10 on one end and/or to a fixed part of the consumer device presentation unit 1 on the other end so that detaching the cable at one of its end would result in at least a partial destruction of either the first electric consumer device 10 or the fixed part of the consumer device presentation unit 1). In one embodiment, the cable 19 may be realized as a spiral cable and it may further be chosen to look very different from any regular charging or mains cable used for the first electric consumer device so that the consumer investigating the first electric consumer device 10 would not get irritated about the details of the product to be expected.

In operation, the charge module 20 may be arranged to charge the first rechargeable energy storage 11 from the first autonomous energy provision unit 30 until the charge module determines that the first rechargeable energy storage 11 is fully charged (the charge module may therefore monitor electrical parameters such as voltages or currents in order to determine whether energy is still taken up by the first electric consumer device). In some embodiments, the first electric consumer device 10 may be equipped with a charge management unit 13 that controls charging of the first rechargeable energy storage 11 and may allow for charging until full charge is detected. In some embodiments, the charge management unit 13 may be arranged to send a signal to the charge module 20 when full charge is detected so that the charge module can stop charging. In some embodiments, the charge module may be arranged to automatically detect when the first electric consumer device does not consume any noticeable energy anymore and may then stop charging. In some embodiments, the charge module may be arranged to interrupt charging for at least 6 hours, 8 hours, 10 hours, 12 hours, 14 hours, 16 hours, 18 hours, 20 hours, 22 hours, 24 hours, 48 hours or any other time span after a full charging was detected. In some embodiments, the charging interrupt time span may be programmable so that the charge module would interrupt charging for for example, 12 hours over night or 48 hours over a weekend. The charge module may be arranged to continue charging prior to the end of the charging interrupt time span in case that the first electric consumer device is removed from its rest position or is switched on.

In some embodiments in which the first electric consumer device is differently used under trial conditions than under real conditions (for example, an electric toothbrush may typically be used under a load when the brush head is pressed against the teeth, but may be used essentially unloaded under trial conditions as consumer would only switch the device on), the charge module may be arranged to take into account a different energy consumption, while the first electric consumer device may not be arranged to take this into account. E.g. the first electric consumer device may be equipped with a charge management unit as explained above, which does not measure the energy consumption of the first electric consumer device but only measures the time the device is switched on and then to multiply this time value with a predetermined energy consumption under a typical loaded situation per time unit (i.e. the charge management unit is calibrated for loaded use). Then the charge management unit may tend to overestimate the consumed energy and may thus tend to overcharge the first rechargeable energy storage in case that it is essentially used in unloaded condition. The charge module may be arranged to take the difference in energy consumption into account. For example, in case that the averaged energy consumption during trial use would be only 70% of the energy consumption during regular use, the charge module would also provide only 70% of the energy while charging in contrast to regular charging. This allows for making only very few changes between electric consumer devices that are being sold for regular use and such electric consumer devices that are being used in a consumer device presentation unit. A particular realization of this general feature is described further below. The charge management unit would then stop charging at about 70% of calibrated full charge, but as the lower energy consumption during trial use is compensated by a lower charging current provided by the charge module, the real achieved charge state would be about 100% full charge.

The first autonomous energy provision unit 30 may in some embodiments be a block battery such as a Cegasa 6AS3/165 having an energy of 1300 Watt hours (Wh) and providing 9 Volt (V) at a maximal current of 50 milliampere (mA) or at a maximal constant current of 38 mA (i.e. in case a maximal current of 50 mA is drawn from the battery, pauses are required so that the maximal constant current of 38 mA is in average achieved). This battery is relatively small (volume of 3.83 dm$^3$) while it provides a high level of energy. In some embodiments, the first autonomous energy provision unit 30 may be a series arrangement of regular 1.5 V mono batteries, for example, six Duracel™ Plus Mono D (LR20) providing 1.5 V each and together in series 9 V. It has been found that in case that the first electric consumer device is realized as an electric toothbrush such as a Braun Oral-B™ Triumph 5000, a total amount of about 7000 statistically averaged trial uses can be energized by an arrangement comprising six Duracell™ Plus Mono D batteries, so that the consumer device presentation unit equipped respectively could support 20 trial uses per day for 350 days until a service person would need to replace the first autonomous energy provision unit.

In some embodiments, the consumer device presentation unit may be equipped with a sensor unit that is able to determine whether the first electric consumer device is being manually investigated by a consumer, for example, the consumer device presentation unit may be equipped with a camera and an image analysis unit that is arranged to detect whether the first electric consumer device is removed from a rest position. In some embodiments, the first electric consumer device may be equipped with a capacitive sensor that can send a signal to the charge module 20 when the capacitive properties around the capacitive sensor have changed such that this change may be indicative of a consumer holding the first electric consumer device in his hand. In some embodiments, the first electric consumer device may be equipped with a motion sensor (for example, an acceleration sensor) that is arranged for sending a signal to the charge module when the first electric consumer device is moved. In some embodiments, the charge module 20 may be arranged to stop charging of the first rechargeable energy support when a signal indicates that the first electric consumer device is being investigated by a consumer, in particular in cases where the first electric consumer device would inhibit usage while being charged.

Figure 2:
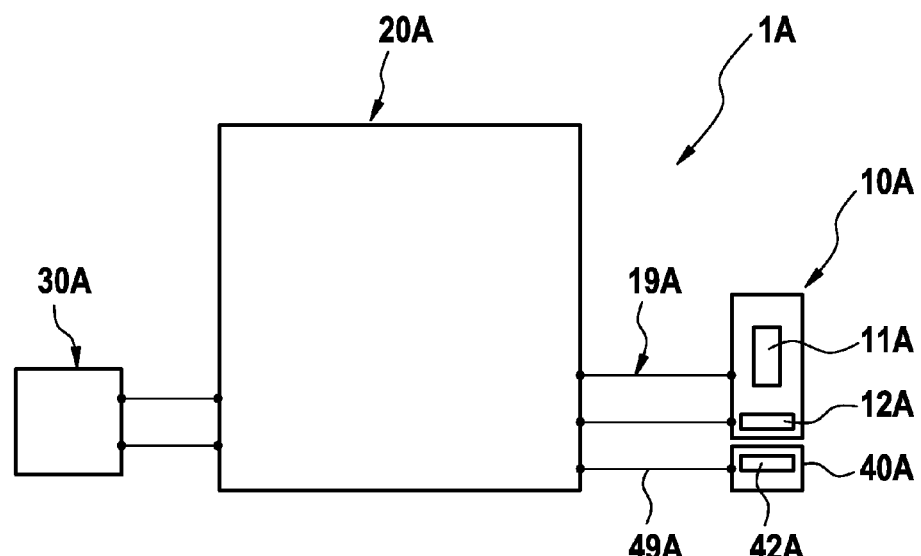
FIG. 2 is a schematic depiction of a second example embodiment of a consumer device presentation unit in accordance with the present disclosure.

FIG. 2 is a schematic depiction of another example embodiment of a consumer device presentation unit 1A in accordance with the present disclosure. As shown in FIG. 1, the consumer device presentation unit 1A comprises a first electric consumer device 10A that is equipped with a first rechargeable energy storage 11A, a charge module 20A, and a first autonomous energy provision unit 30A. The consumer device presentation unit 1A further comprises a first support 40A on which the first electric consumer device 10A can be placed while it is not investigated by a consumer. The first electric consumer device 10A is connected to the charge module 20A with a cable 19A, which cable 19A is arranged to allow charging of the first rechargeable energy storage 11A. The first support 40A may be connected to the charge module 20A via signal cable 49A, which signal cable may be arranged to allow transmission of a signal at least from the first support 40A to the charge module 20A. In some embodiments, the first electric consumer device 10A may be equipped with a device sensor element 12A arranged in a part of the first support proximal to the first electric consumer device 10A when it is placed on the first support 40A. The first support 40A may be equipped with a support sensor element 42A arranged close to the support sensor element when the first electric consumer device 10A is placed on the first support 40A. In some embodiments, the support sensor element 42A may be a reed switch and the device sensor element may be a permanent magnet, so that the support sensor element and the device sensor element together form a reed contact that may be closed while the first electric consumer device 10A is placed on the first support 40A and that may open when the first electric consumer device 10A is removed from the first support 40A. The device sensor element and the support sensor element together form a sensor unit allowing for functionality as has been described in the previous paragraph.

In some embodiments, only the first support 40A may be equipped with a capacitive sensor as support sensor element 42A, which capacitive sensor may be arranged to detect when the first electric consumer device is placed on the first support and when it is removed due to changes in the capacitive environment around the capacitive sensor. In some embodiments, the first support may be equipped with an optical sensor as support sensor element that is arranged to determine whether the first electric consumer device is placed on the first support or whether it is removed. The support sensor element then forms a sensor unit allowing for functionality as has been described in a previous paragraph.

As was mentioned above, the charge module 20A may be arranged to stop charging of the first electric consumer device when the first support 40A sends a signals that is indicative of a removal of the first electric consumer device 10A from the first support 40A.

Figure 3:
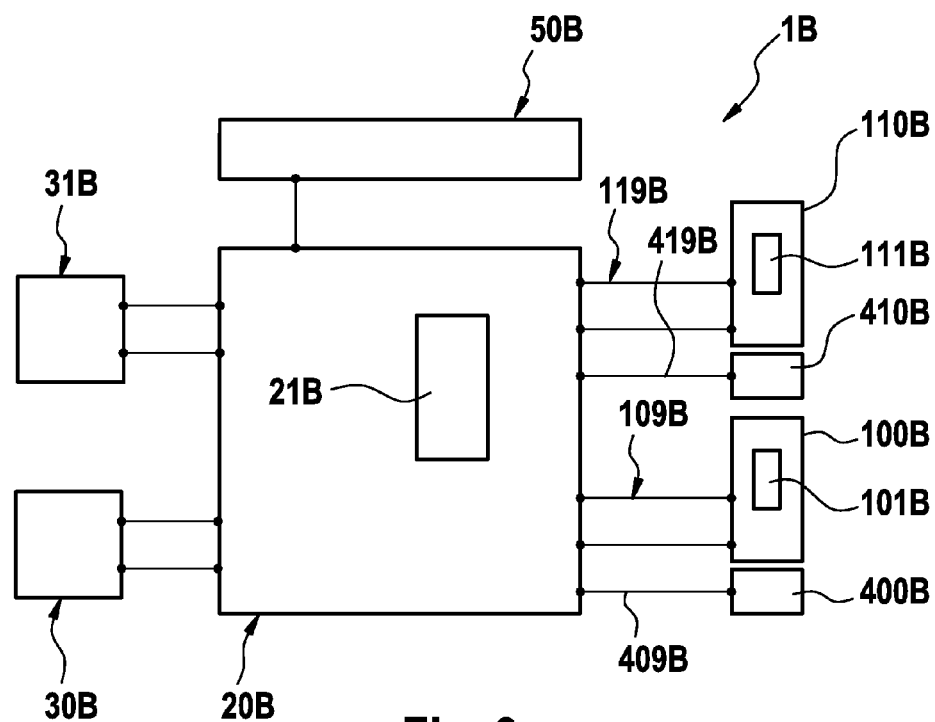
FIG. 3 is a schematic depiction of a third example embodiment of a consumer device presentation unit in accordance with the present disclosure.

FIG. 3 shows another schematic depiction of an example embodiment of a consumer device presentation unit 1B in accordance with the present disclosure. The consumer device presentation unit 1B comprises a first electric consumer device 100B and a second electric consumer device 110B, which are both connected to a charge module 20B. A first autonomous energy provision unit 30B is connected to the charge module 20B. In some embodiments, a second autonomous energy provision unit 31B may also be connected to the charge module 20B. A first support 400B may be provided for receiving the first electric consumer device 100B in a rest position and a second support 410B may be provided for receiving the second electric consumer device 110B in a rest position. The first electric consumer device 100B is equipped with a first rechargeable energy storage 101B and the second electric consumer device 110B is equipped with a second rechargeable energy storage 111B. As was discussed with reference to FIGS. 1 and 2, each of the first and second electric consumer devices may be equipped with a respective device sensor element and/or a charge management unit. The first and second supports 400B and 410B may each be equipped with a support sensor element.

The charge module 20B may be equipped with a multiplexing unit 21B for sequentially charging the first and second electric consumer devices 100B and 110B, which in particular allows for using a first autonomous energy provision unit providing only a limited constant current.

In some embodiments, the first and second electric consumer devices may be (in particular concurrently) charged under control of the charge module 20B from respective first and second autonomous energy provision units 30B and 31B.

It is noted that the number of electric consumer devices presented on a consumer device presentation unit in accordance with the present disclosure may not be limited and the number may be one, two, three, four, five, six, seven, eight or any other number. In some embodiments, each electric consumer device may uniquely or bi-uniquely be associated with a respective autonomous energy provision unit.

In general and not limited to the shown embodiment, the charge module 20B may be connected to a user interface 50B via which a user can input data and/or via which information is shown to the user.

In general and not limited to the shown embodiment, the charge module 20B may be arranged to perform a self test when it is connected to a first or further autonomous energy provision unit.

It has been described that the first electric consumer device may be monitored via a sensor unit and that in particular charging may be interrupted when it is detected that the first electric consumer device is removed from its rest position. It has been discussed that the sensor unit may be partly placed in the first support and partly in the first electric consumer device. Instead of such a location of the sensor unit, the sensor unit may be arranged at a cable connecting the first electric consumer device with the consumer device presentation unit. The cable may in particular serve anti-theft purposes. In case that the first electric consumer device is removed from its rest position, the cable will inevitably be moved too and this can be monitored by a sensor unit arranged at the cable or partly at the cable and partly at a fixed part of the consumer device presentation unit. E.g. a reed switch can be arranged as a first sensor element at a fixed part of the consumer device presentation unit while a respective permanent magnet for closing/opening the reed switch can then be arranged at the cable as a second sensor element.

In one embodiment, the cable may be arranged as a self-spooling cable that supports that the first and the second sensor element are always in the same spatial relationship when the first electric consumer device is in its rest position. Therefore, in addition to such an arrangement being an alternative to the before described sensor units, it may be considered as an invention in itself to provide a consumer device presentation unit that comprises at least a first electric consumer device that is connected to a fixed part of the consumer device presentation unit by a cable element, wherein a sensor unit is arranged to monitor the relative movement of the cable unit with respect to the fixed part of the consumer device presentation unit, which sensor unit is arranged to provide a signal in case such a relative movement is detected. The consumer device presentation unit may in particular be arranged with a display for presenting information triggered by the signal. At least a second electric consumer device may be provided in addition to the first electric consumer device. The second electric consumer device may also be connected to a fixed part of the consumer device presentation unit by a cable at which a sensor unit is arranged for monitoring a relative movement of the cable with respect to the fixed part and for providing a signal when such relative movement is detected. The display may then be arranged to selectively provide information about the particular electric consumer device that was moved.

Figure 4:
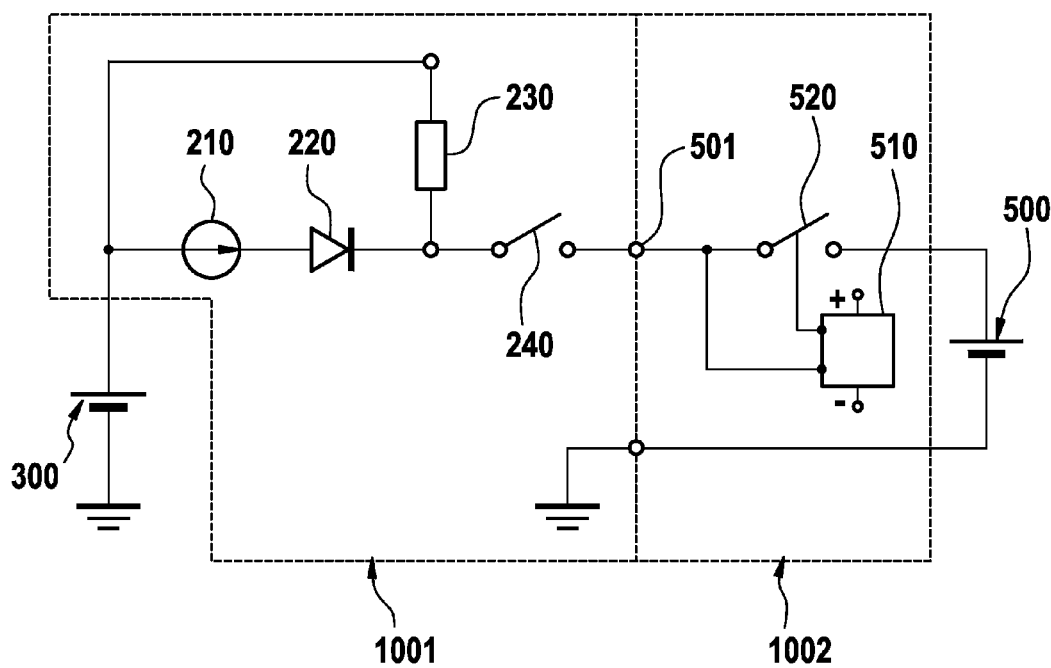
FIG. 4 is a schematic depiction of circuit aspects of a charge module and of a charge management unit of an electric consumer device.

FIG. 4 is a schematic depiction of some circuit aspects in accordance with the present disclosure. A first autonomous energy provision unit 300 which may provide 9 V is coupled to a first control circuit 1001 which may in particular be part of any charge module discussed before. The first control circuit 1001 is connected with a first rechargeable energy storage 500, which can be charged under control of a second control circuit 1002, which may be part of any charge management unit of an electric consumer device discussed before.

The first control circuit 1001 comprises a constant current source 210 that is arranged to provide a constant current from the first autonomous energy provision unit 300, for example, 38 mA. A pull-up resistor 230 is arranged to provide a certain high voltage at the input terminal 501 of the second control circuit 1002, e.g. 5.4 V (assuming that the voltage provided by the first autonomous energy provision unit is high enough). A diode 220 is arranged to better secure the constant current source 210 from influences. A switch 240 is arranged that may be switched at a high frequency, for example, 30 kHz, to indicate to the second control circuit that charging current is being offered. The second control circuit 1002 monitors the voltage edges present at the input terminal 501 and is arranged to detect that charging is offered when respective fast and high voltage edges are detected. A control unit 510, which may be realized as a microcontroller, then closes switch 520 during a time span that the control unit considers as necessary to fully charge the first rechargeable energy storage 500.

In some embodiments, the control unit 510 may set the time span for full charge based on the provided current height, i.e. a higher time span for low currents and a lower time span for high currents. In some embodiments, the control unit may not be able or may not be arranged to distinguish between currents that are below a threshold current value, for example, about 70 mA. As was mentioned above, in situations, where it is known that the trial use consumes less energy than the regular use of the electric consumer device (for example, about 70%), the first control circuit 1001 may now provide only a fraction (for example, about 70%, which would be about 50 mA in the above example with a threshold current value of 70 mA) of the lowest current that the second control circuit would still be able to compensate with respect to charging time spans. Then there is no need to modify the second control circuit 1002, i.e. a charge management unit as discussed before, to cope with the different energy consumptions in regular (i.e. loaded) use and trail use, which allows for essentially taking a series electric consumer device that does not require any substantial modifications for use in a consumer device presentation unit as disclosed.

Figure 5:
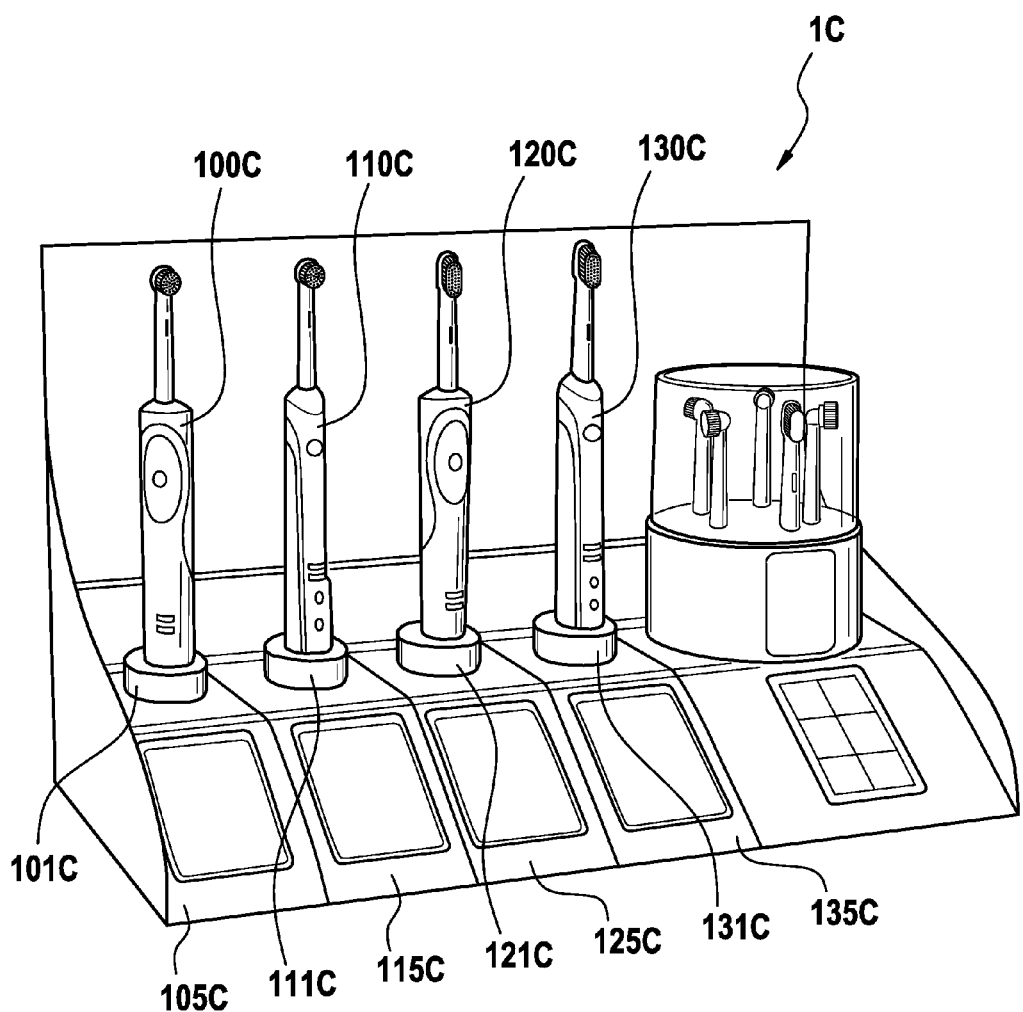
FIG. 5 is a depiction of an example embodiment of a consumer device presentation unit, where as electric consumer devices electric toothbrushes are presented.

FIG. 5 is a depiction of a consumer device presentation unit 1C on which four electric consumer devices 100C, 110C, 120C, or 130C are presented. Each of the electric consumer devices 100C, 110C, 120C, or 130C has a support 101C, 111C, 121C, or 131C for receiving the respective electric consumer device in a rest position. Each of the electric consumer devices together with its support is placed on a presenter box 105C, 115C, 125C, or 135C, which presenter boxes may be modular so that the number of presenter boxes and thus exhibited electric consumer devices can be individually adapted. Each of the presenter boxes may in particular be arranged to house an autonomous energy provision unit and/ or a charge module. For example, the first presenter box 105C may house a first autonomous energy provision unit and a charge module and may be considered the base presenter box. The other presenter boxes 115C, 125C, 135C may then only provide electrical connection between the charge module and the respective second, third and fourth electric consumer product. In some embodiments, the presenter boxes may additionally house further autonomous energy provision units. In some embodiments, each presenter box houses a charging module and an autonomous energy provision unit so that each presenter box can be independently used.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumer device presentation unit comprising: at least a first electric consumer device and a second electric consumer device, the first electric consumer device including at least a first rechargeable energy storage; at least a first autonomous energy provision unit; and a charge module coupled at least to the first autonomous energy provision unit and the first electric consumer device, wherein the charge module is connected with the first rechargeable energy storage for direct charging, and wherein the second electric consumer device includes a second rechargeable energy storage and is connected to the charge module for direct charging, wherein the charge module is arranged to sequentially charge the first and second electric consumer devices.

2. The consumer device presentation unit according to claim 1, further comprising at least a first support on which the first electric consumer device can be placed, the first support including a support sensor element and the first electric consumer device including a device sensor element, wherein the support sensor element and the device sensor element are arranged to provide a signal indicating that the first electric consumer device was removed from the first support.

3. The consumer device presentation unit according to claim 2, wherein the charge module is arranged to interrupt charging of the first rechargeable energy storage when the first electric consumer device is removed from the first support.

4. The consumer device presentation unit according to claim 1, further comprising a second autonomous energy provision unit that is connected to the charge module and wherein the charge module is arranged to charge the first electric consumer device from the first autonomous energy provision unit and the second electric consumer device from the second autonomous energy provision unit.

5. The consumer device presentation unit according to claim 1, wherein the charge module and the first electric consumer device are arranged for communication at least from the charge module to the first electric consumer device.

6. The consumer device presentation unit according to claim 1, further comprising a user interface.

7. The consumer device presentation unit according to claim 1, wherein the first autonomous energy provision unit provides a voltage in a range of about 3 Volt to about 15 Volt, and wherein the first autonomous energy provision unit is arranged to provide a constant current of about 50 milliampere or less.

8. The consumer device presentation unit according to claim 1, wherein the charge module is arranged to perform a self-test after being coupled to the first autonomous energy provision unit.

9. A consumer device presentation unit comprising: at least a first electric consumer device including at least a first rechargeable energy storage; at least a first autonomous energy provision unit; and a charge module coupled at least to the first autonomous energy provision unit and the first electric consumer device, wherein the charge module is connected with the first rechargeable energy storage for direct charging, and wherein the first electric consumer device is arranged for being inductively charged and wherein the charge module is arranged to emulate an inductive charging process via the direct connection.

10. The consumer device presentation unit according to claim 9, wherein the charge module includes a constant current source that is arranged to provide a current below a minimal current that can be measured by the first electric consumer device.

11. A consumer device presentation unit comprising: at least a first electric consumer device including at least a first rechargeable energy storage; at least a first autonomous energy provision unit; and a charge module coupled at least to the first autonomous energy provision unit and the first electric consumer device;
at least a first support on which the first electric consumer device can be placed, the first support including a support sensor element and the first electric consumer device including a device sensor element, wherein the support sensor element and the device sensor element are arranged to provide a signal indicating that the first electric consumer device was removed from the first support, wherein the charge module is arranged to determine when a full charging of the first rechargeable energy storage is achieved and to pause charging of the first electric consumer device for at least a time span in a range of between about 6 hours to about 48 hours in case that a full charging is determined as long as the first electric consumer device is not removed from the first support.

12. A consumer device presentation unit comprising:
at least a first electric consumer device including at least a first rechargeable energy storage; at least a first autonomous energy provision unit; and a charge module coupled at least to the first autonomous energy provision unit and the first electric consumer device, wherein the at least first electric consumer device includes a charge management unit calibrated for a loaded use of the at least first electric consumer device and wherein the charge module is arranged to control charging of the at least first rechargeable energy storage such that the charge management unit stops charging within a range of about 50% to about 90% of calibrated full charge.

13. A consumer device presentation unit comprising:
at least a first electric consumer device including at least a first rechargeable energy storage; at least a first autonomous energy provision unit; and a charge module coupled at least to the first autonomous energy provision unit and the first electric consumer device,
wherein the charge module is connected with the first rechargeable energy storage for direct charging, and wherein the direct connection between the charge module and the first electric consumer device is established by a cable, which is non-detachably connected to the first electric consumer device.

* * * * *